United States Patent [19]

Citta

[11] Patent Number: 4,554,579

[45] Date of Patent: Nov. 19, 1985

[54] TWO-WAY CATV SYSTEM WITH AML COMMANDS

[75] Inventor: Richard W. Citta, Oak Park, Ill.

[73] Assignee: Zenith Electronics Corporation, Glenview, Ill.

[21] Appl. No.: 648,841

[22] Filed: Sep. 6, 1984

Related U.S. Application Data

[63] Continuation-in-part of Ser. No. 560,029, Dec. 9, 1983, abandoned.

[51] Int. Cl.⁴ .................. H04N 7/10; H04N 7/14; H04N 7/16
[52] U.S. Cl. ................................. 358/86; 358/122; 455/4; 455/5
[58] Field of Search .................. 358/84, 86, 122, 123, 358/124, 147; 455/2, 4, 5

[56] References Cited

U.S. PATENT DOCUMENTS

| | | | |
|---|---|---|---|
| 3,769,579 | 10/1973 | Harney | 358/84 |
| 4,091,417 | 5/1978 | Nieson | 358/124 X |
| 4,107,734 | 8/1978 | Percy et al. | 358/84 |
| 4,381,522 | 4/1983 | Lambert | 358/86 |
| 4,385,314 | 5/1983 | Yashiro et al. | 358/84 |
| 4,390,900 | 6/1983 | Van Kampen et al. | 358/147 |
| 4,460,922 | 7/1984 | Ensinger et al. | 358/122 |
| 4,486,773 | 12/1984 | Okubo | 358/84 |
| 4,512,033 | 4/1985 | Schrock | 455/2 |

Primary Examiner—Keith E. George

[57] ABSTRACT

In a two-way cable television (CATV) system, multiple subscriber address codes are provided during designated vertical blanking interval (VBI) lines of the video signal transmitted from the CATV headend to a plurality of system subscriber terminals. Each subscriber terminal is provided with a decoder in which is stored subscriber unique address code for comparison with the received subscriber address codes. If there is an address match, an address match latch (AML) signal is generated for each VBI line address match. The address match signals thus generated from a multibit pulse coded downstream command signal for initiating various functions in the CATV system, e.g., acknowledging subscriber upstream requests, subscriber interrogation, power adjustment, etc.

9 Claims, 2 Drawing Figures

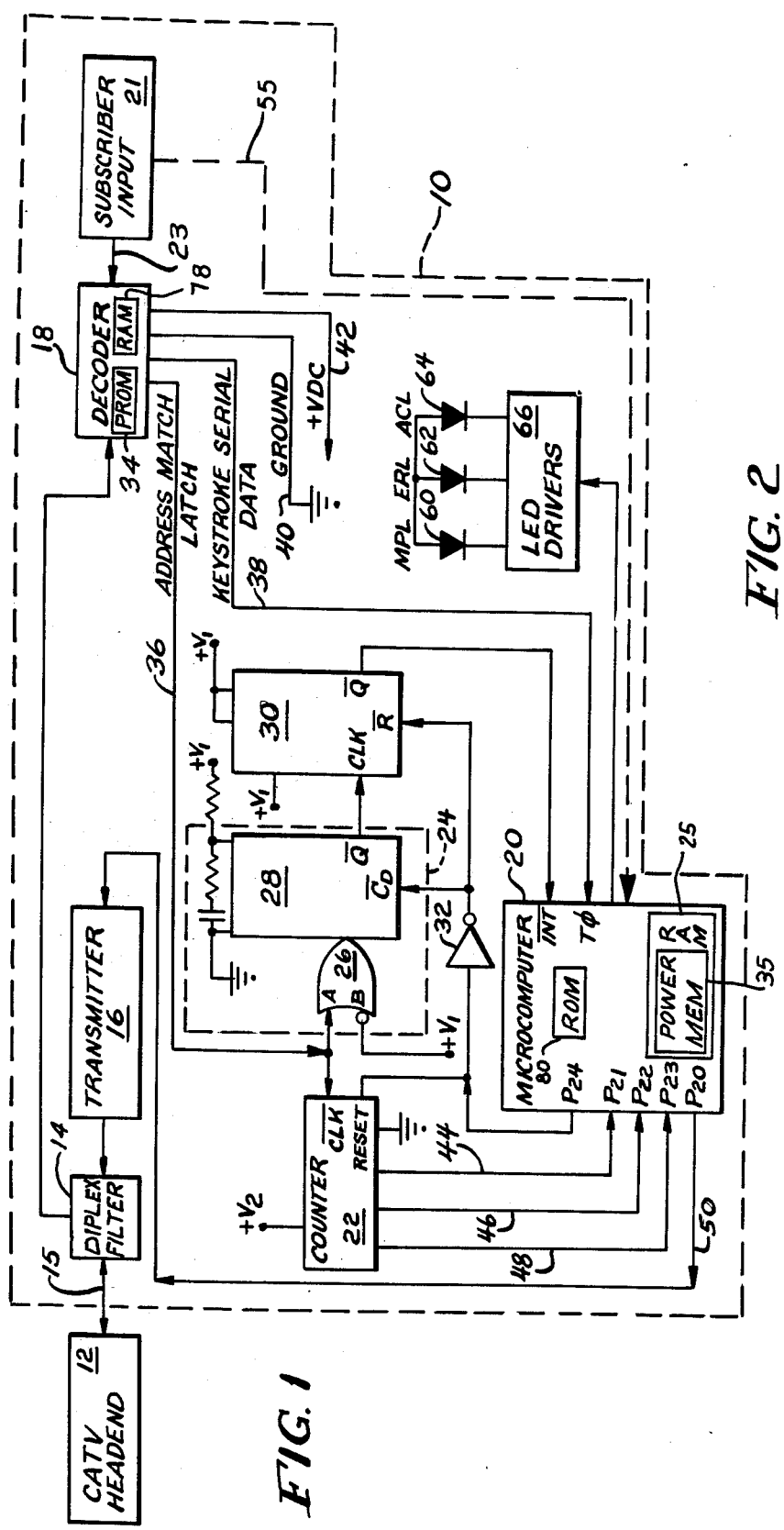
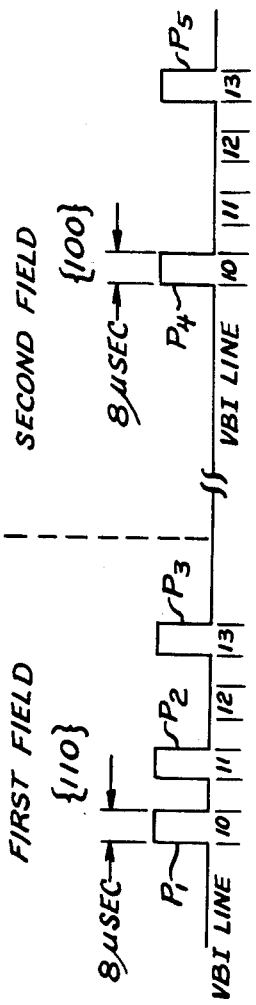
FIG. 1
FIG. 2

TWO-WAY CATV SYSTEM WITH AML COMMANDS

CROSS-REFERENCE TO RELATED APPLICATIONS

This application is a continuation-in-part of application Ser. No. 560,029, filed Dec. 9, 1983, now abandoned, and is related to but in no way dependent upon the following application which is assigned to the assignee of the present application: Ser. No. 560,028, filed Dec. 9, 1983, abandoned in favor of continuation-in-part application Ser. No. 648,596, filed Sept. 6, 1984, entitled "Upstream Data Packet Time Slot Synchronization With Downstream VBI for Two-Way CATV System" in the name of Richard W. Citta.

BACKGROUND OF THE INVENTION

This invention relates generally to two-way cable television (CATV) systems and is particularly directed to the transmission of data from the headend to a plurality of subscribers in a two-way CATV system.

CATV systems typically include a central master source of television programming information termed a headend which imparts programs, or groups of programs at different assigned frequencies, to a network of cable connections which, through various distribution and selection network components, ultimately terminate in a branched out plurality of subscriber terminals typically in residence or commercial establishments. CATV program signals are broadcast from the headend to individual subscribers in a "downstream" direction over different assigned carrier frequencies typically from about 50 to 450 MHz. The CATV headend not only transmits television programming information downstream, but may also transmit data in the form of, for example, subscriber address and authorization information, which allows the stored program decode authorization status of each subscriber to be individually controlled from the headend. Frequently, such data is encoded in the vertical blanking interval (VBI) of a transmitted CATV program signal. The program decode authorization status stored in each subscriber's terminal is compared with a program code also encoded in the VBI of the received CATV signal to establish whether or not the subscriber is authorized for decoding the received program signal.

In a two-way CATV system each subscriber is able to transmit signals back to the CATV headend. These subscriber-originated signals may include program purchasing requests, opinion poll responses, and CATV converter status information. These upstream signals typically make use of out of band frequencies in the 5-32.5 MHz band. The upstream signal distribution network is in the form of a "merging tree topology" in which the signals generated by many sources, or subscribers, converge and are transmitted on a single transmission line back to the CATV headend. Such techniques as signal multiplexing and frequency diversity have been proposed and are utilized to accomodate large numbers of subscribers in two-way CATV systems.

Proper response to the subscriber-originated signals normally requires the exercise of headend control over the various remotely located subscriber terminals coupled to the CATV system. The exercise of such control requires the downstream transmission of various command signals from the headend controller to the subscriber terminals.

The present invention provides a facility whereby such headend control of subscriber terminals may be conventiently realized within the environment of a prior art CATV system employing VBI data transmission techniques. In particular, a headend command signal is transmitted during a single VBI in the form of a multibit code, each bit of which is represented by the transmission or non-transmission of a subscriber address code during a respective predetermined time interval of the VBI. At the subscriber's terminal, the received address codes are processed to reconstruct the multibit code which is subsequently decoded for use in controlling various aspects of the terminal.

OBJECTS OF THE INVENTION

Accordingly, it is a basic object of the present invention to provide a facility for enabling headend control of a plurality of subscriber terminals in a two-way CATV system.

It is a more specific object of the present invention to provide such a facility in the environment of an addressable CATV system using VBI data transmission techniques.

Yet another object of the present invention is to provide such a facility in an extremely convenient and cost-effective manner.

BRIEF DESCRIPTION OF THE DRAWINGS

The appended claims set forth those novel features believed characteristic of the invention. However, the invention itself, as well as further objects and advantages thereof, will best be understood by reference to the following detailed description of the preferred embodiment taken in conjunction with the accompanying drawings, in which:

FIG. 1 shows in block and schematic diagram form a two-way CATV system in accordance with the present invention; and FIG. 2 is a waveform diagram useful in explaining the operation of the system shown in FIG. 1.

DESCRIPTION OF THE PREFERRED EMBODIMENT

Referring to FIG. 1, there is shown in combined schematic and blcok diagram form a subscriber terminal 10 for a two-way CATV system in accordance with the present invention. The system also includes a cable headend 12 coupled to each subscriber terminal 10 via a cable 15 and which typically includes a computer, multiple terminals, disc drives and a tape backup. These elements of the cable headend 12 are not shown in FIG. 1 as they do not form a part of the present invention. Downstream signals from the cable headend 12 to individual subscribers may include such information as subscriber address, program authorization, and market codes as well as program identification data which is transmitted in television channels having frequencies between about 50 and 450 MHz. This data may be provided during the vertical blanking interval (VBI) of the downstream video programming signals, such as in lines 10 through 13 of the VBI as shown in Table I. Although the present invention is described herein as making use of VBI lines 10–13 of the video programming signals for the downstream transmission of subscriber terminal commands, it is not limited to the use of these VBI lines and may utilize any portion of the vertical retrace signal including any combination of VBI lines, consecutive or nonconsecutive.

TABLE I

| | | |
|---|---|---|
| VBI Line 10 | m-BIT ADDRESS CODE | n-BIT AUTHORIZATION CODE |
| VBI Line 11 | m-BIT ADDRESS CODE | n-BIT AUTHORIZATION CODE |
| VBI Line 12 | m-BIT ADDRESS CODE | n-BIT AUTHORIZATION CODE |
| VBI Line 13 | x-BIT MARKET CODE | y-BIT PROGRAM TAG |

The VBI occurs during vertical retrace of the raster scanned cathode ray tube (CRT) of the subscriber's television receiver and comprises about 21 horizontal scanning lines. Referring to Table I above, in a known one-way addressable CATV system an m-bit subscriber address code and a related n-bit program authorization code are selectively transmitted during each of lines 10, 11 and 12 of the VBI. Each address code may comprise 20 bits with each authorization code comprising 5 bits. During line 13 of the VBI there is continuously transmitted an x-bit (e.g. 11 bits) market code which defines the geographic area in which the system is operating as well as a y-bit (e.g. 7 bits) program identification code, or tag, defining the accompanying television program. These downstream signals are received by each subscriber terminal 10 and coupled by a diplex filter 14 to a decoder 18 which includes a suitable tuner tuned to an encoded CATV channel. Each received m-bit address code is compared with a unique subscriber address code stored in a programmable read only memory (PROM) 34 of decoder 18 in each subscriber terminal 10. If the received subscriber address code matches the unique subscriber address code stored in the decoder's PROM 34, the program authorization code of the same VBI line is stored in a random access memory (RAM) 78 in decoder 18 which defines the program decode authorization status of the subscriber. A match between the received and stored address codes will also result in the generation of an address match latch (AML) pulse by decoder 18, which pulse is provided on an output line 36 of decoder 18.

The x-bit market code received during line 13 of each VBI is compared with a subscriber terminal market code also stored in the decoder's PROM 34. A match between the transmitted and stored market codes will enable the decoder 18 and also result in the generation of an address match latch (AML) pulse which is similarly provided on line 36. A match between the received y-bit program tag code and the stored program decode authorization status permits the decoder to descramble the received CATV video programming signal which may then be viewed on the subscriber's television receiver (not shown). The absence of a match between the received program tag code and the stored program authorization status results in the video programming signal being passed on by the subscriber terminal 10 in a scrambled form. Thereafter, decoder 18 continuously monitors incoming data for detecting each subsequent address or market code match.

As previously mentioned, each match between a received subscriber address code and the unique subscriber address code stored in PROM 34 of decoder 18 results in an AML pulse on line 36. According to the present invention, the selective transmission of subscriber address codes on horizontal lines 10-13 of the VBI is used to provide a 4-bit headend command control code on line 36, each bit being represented by the presence or absence on an AML pulse. As will be explained in further detail hereinafter, this 4-bit AML control code is decoded by counting the number of AML pulses developed during each VBI and by determining the mode of operation of terminal 10 such that various two-way related functions of the terminal can be controlled from the headend.

With further reference to FIG. 1, the AML pulses developed on line 36 by decoder 18 are couled to a binary counter 22 and to a one-shot monostable multivibrator 24. Various other signals are also output by decoder 18. These signals include keystroke serial data provided via line 38 to a microcomputer 20. This keystroke serial data may include such information as channel number selection, cable selection, or program authorization requests as provided to decoder 18 via line 23 by a subscriber input device 21. This data may also be provided directly from subscriber input device 21 to microcomputer 20 by means of line 55 (shown in dotted line form) in another embodiment. The decoder 18 is coupled to ground potential via line 40. Finally, decoder 18 provides a +VDC output to the various components of the CATV subscriber terminal 10 as required.

The AML pulses provided by decoder 18 to counter 22 and monostable multivibrator 24 are in the form of 8 microsecond pulses as shown in FIG. 2. As previously mentioned, according to the present invention, various combinations of the AML pulses are formed during each VBI by selectively transmitting appropriate address codes for selectively commanding each terminal from the headend. For example, the pulse diagram of FIG. 2 shows three AML pulses $P_1$, $P_2$ and $P_3$. AML pulses $P_1$ and $P_2$ represent subscriber address code matches during VBI lines 10 and 11 while AML pulse $P_3$ represents a market code match during VBI line 13. It will be appreciated that the market code match AML pulse $P_3$ cannot be used to represent any data since it is transmitted during every VBI by the headend. During the subsequent field, an AML pulse $P_4$ represents an address code match during VBI line 10 and an AML pulse $P_5$ represents a market code match during VBI line 13. With each AML pulse width equal to 8 microseconds, a 64 microsecond interval is provided between adjacent AML pulses.

The AML pulses produced on line 36 are provided to the A input of an OR gate 26, which in combination with multivibrator circuit 28 forms one-shot monostable multivibrator 24. The output of monostable multivibrator 24 is provided, in turn, to a D-type flip-flop circuit 30 which provides a timed output to the $\overline{INT}$ input pin of microcomputer 20 for initiating an interrupt therein. Following receipt from flip-flop 30 of an interrupt signal provided to its $\overline{INT}$ input pin, microcomputer 20, which in a preferred embodiment is an 8048 microcomputer with a 2K ROM and a 64 byte RAM, finishes its current operation, or task, and executes another subroutine. In a preferred embodiment of the present invention the subroutine executed by microcomputer 20 following receipt of the interrup signal involves interpreting the headend command represented by the AML pulses developed during the current VBI and, if necessary the upstream transmission of data from the subscriber terminal 10 to the CATV headend 12 in response thereto. The upstream data transmission from microcomputer 20 is effected via output line 50, transmitter 16 and diplex filter 14.

In greater detail, the AML pulses on line 36 are provided to the A input of OR gate 26 of one-shot monostable multivibrator 24. The inverted B pin of OR gate 26 is coupled to a $+V_1$ source. Each AML pulse provided to OR gate 26 triggers multivibrator 28 for initiating a negative-going pulse at its $\overline{Q}$ output which is coupled to the CLK input of D-type flip-flop circuit 30. The RC time constant of the circuit coupled to multivibrator 28 is selected such that the width of this negative-going pulse is about 250 microseconds in a preferred embodiment. D-type flip-flop 30 is triggered by the positive going edge of the $\overline{Q}$ output of multivibrator 28. It will be recalled that an AML pulse is produced by decoder 18 during horizontal line 13 of each field in response to a market code match. The 250 microsecond duration of the output of monostable multivibrator 28 is of sufficient length to insure triggering of flip-flop 30 only 250 microseconds after this market code induced horizontal line 13 AML pulse so as to provide a precise timing reference signal at its $\overline{Q}$ output. In particular, multivibrator 28 will be triggered or retriggered by the horizontal line 13 AML pulse regardless of the number of AML pulses preceding it in a given field and before producing a positive-going output transition such that the $\overline{Q}$ output of flip-flop 30 will go low at a fixed time each field, i.e., 250 microseconds after the horizontal line 13 AML pulse.

The low $\overline{Q}$ output from flip-flop circuit 30 is provided to the $\overline{INT}$ input pin of microcomputer 20 for initiating an interrup routine for sampling the output of counter 22 provided on pins $P_{21}$, $P_{22}$ and $P_{23}$. Based on the sampled count and on the mode of the subscriber's terminal 10, appropriate responsive action is taken. Following a predetermined time interval as established by the operating program in the microcmputer's ROM 80, microcomputer 20 provides a reset pulse from its $P_{24}$ output pin to the RESET input of counter 22 and, via inverter 32, to the CLEAR ($C_D$) and RESET ($\overline{R}$) inputs of multivibrator 28 and flip-flop 30, respectively. The reset output from microcomputer 20 prepares counter 22 and the combination of one-shot monostable multivibrator 24 and flip-flop 30 for receipt of the next series of AML pulses from decoder 18 during the VBI of a subsequent video field.

Counter 22 is a binary counter, to the CLK input of which is provided the AML pulses from decoder 18. Counter 22 provides a binary output signal via lines 44, 46 and 48 to the $P_{21}$, $P_{22}$ and $P_{23}$ input pins, respectively, of microcomputer 20 representing the number of AML pulses developed by decoder 18 during each field of the received signal. As will be explained in further detail below, according to the present invention this binary coded signal which, during each field, may take a value between decimal 1 and decimal 4, is used to provide headend initiated command signals to microcomputer 20 which may include system status information requests or headend initiated command signals for controlling each remote subscriber terminal.

Referring to Table II, there is shown an exemplary definition of the headend commands represented by the multibit AML control signals which may be developed on line 36 during the VBI's of the received signal and the corresponding output of counter 22. In this Table, a "1" represents the development of an AML pulse in a particular VBI line by decoder 18 with the count of such AML pulses during each VBI by counter 22 being given in decimal format. Also, for purposes of convenience the horizontal line 13 AML pulse is not considered since it is always present.

TABLE II

| MODE 1 | | MODE 2 | COUNTER 22 |
|---|---|---|---|
| MESSAGE PENDING VBI .DATA LINES 10, 11, 12 | | STANDBY | |
| | (XXX) | | |
| POSITIVE ACKNOWLEDGE | (100) (010) (001) | IGNORED | 1 |
| IGNORED | (011) (101) (110) | INTERROGATE | 2 |
| NEGATIVE ACKNOWLEDGE | (111) | POWER ADJUSTMENT | 3 |

MPL: MESSAGE PENDING LIGHT (YELLOW LED)
EPL: ERROR LIGHT (RED LED)
ACL: ACKNOWLEDGE LIGHT (GREEN LED)

In accordance with the present invention, each subscriber terminal 10 is capable of operating in two different modes. A first mode is termed the "message pending" mode, while the second mode of operation is termed "standby". In the message pending mode, the subscriber terminal 10 has transmitted a message upstream to the CATV headend 12, such as a program authorization request, and is waiting for a response thereto from the headend. The upstream message may be generated in response to subscriber entries via subscriber input device 21 which, in turn, are provided to microcomputer 20. The headend response may be in the form of a POSITIVE ACKNOWLEDGE command (indicating that the requested program authorization will be granted) or a NEGATIVE ACKNOWLEDGE command (indicating that the requested program authorization will not be granted).

In a second standby mode of operation the subscriber terminal 10 is in a ready state for receipt of downstream data from the CATV headend. In this mode, receipt of downstream data by the subscriber terminal 10 results in the performance of a specific operation by the subscriber terminal or the providing of information from subscriber terminal 10 to the CATV headend 12.

From TABLE II, it can be seen that the subscriber terminal interprets downstream data from the CATV headend 12 in accordance with its operating mode. For example, a single AML pulse in any of VBI lines 10, 11 or 12 (represented by counter 22 accumulating a "1" count during the complete VBI) represents a POSITIVE ACKNOWLEDGE signal from the CATV headend when the subscriber terminal is in the message pending mode of operation and is ignored when the terminal is in the standby mode of operation. Two AML pulses received in any of VBI lines 10, 11 and 12 (represented by counter 22 accumulating a "2" count during the VBI) is interpreted by the terminal when in the standby mode as an INTERROGATE command and is ignored in the message pending mode. Finally, an AML pulse received in each of VBI lines 10, 11 and 12 (represented by counter 22 accumulating a "3" count during the VBI) represents a NEGATIVE ACKNOWLEDGE command from the CATV headend 12 to subscriber terminal 10 in the message pending mode and as a POWER ADJUSTMENT command in the standby mode.

As mentioned previously the POSITIVE or NEGATIVE ACKNOWLEDGE commands may be used by the headend to provide an answer or response to a program authorization request by a subscriber. For example, receipt of a POSITIVE ACKNOWLEDGE command by a subscriber terminal may indicate that an upstream request for access to a CATV program is acknowledged and that decode authorization for the requested program will be granted by the CATV headend. On the other hand, a NEGATIVE ACKNOWLEDGE may indicate that the request has been denied. The INTERROGATE command may, for example, represent a request by the CATV headend for the subscriber terminal to provide information relating to the channel to which the subscriber terminal is tuned. Various other subscriber terminal operating parameters may be requested by means of the INTERROGATE command signal from the CATV headend.

With the CATV terminal in the standby mode, receipt of an AML pulse in each of VBI lines 10, 11 and 12 (represented by the accumulation of a "3" count by counter 22 during the VBI) represents a POWER ADJUSTMENT command for adjusting the upstream signal power output of the subscriber terminal. The direction of power adjustment by the subscriber terminal is determined by the state of a power memory 35 within the random access memory (RAM) 25 of microcomputer 20. The power memory 35 in a preferred embodiment is a power status memory bit within the microcomputer's RAM 25. The power memory 35 operates as a binary switch which changes its state in response to receipt of an INTERROGATE command from the CATV headend 12 when the subscriber terminal 10 is in the standby mode of operation. Each time the subscriber terminal 10 receives an INTERROGATE command from the CATV headend, the power memory 35 changes state. In addition, a response is provided by the subscriber terminal 10 to the CATV headend 12 indicating whether power will be increased or decreased following receipt of the next POWER ADJUSTMENT signal from the CATV headend. Thus, after the CATV headend determines whether the subscriber terminal power is to be increased or decreased and using the aforementioned power memory status information, the CATV headend then decides whether its next output should be an INTERROGATE command or a POWER ADJUSTMENT command. If the power memory 35 is set in the desired direction, the CATV headend will next provide a POWER ADJUSTMENT command to the subscriber terminal. If, however, the CATV headend determines that a power adjustment executed by the subscriber terminal will be in the wrong direction, it provides an INTERROGATE command to the subscriber terminal which changes the state of the power memory 35 to permit subscriber terminal power to be adjusted in the opposite direction following receipt of the next POWER ADJUSTMENT command from the CATV headend. The INTERROGATE command thus acts to toggle the power memory 35 and results in a response from the subscriber terminal 10 to the CATV headend 12 with a status message. The POWER ADJUSTMENT command causes either an incrementing or a decrementing of the subscriber terminal output power and also results in a power signal being provided from the subscriber terminal 10 to the CATV headend 12.

In conjunction with the various commands provided from the CATV headend to a subscriber terminal, visual indications may be provided to a subscriber for indicating system status. For example, various light emitting diodes (LED's) 60, 62 and 64 may be coupled to the microcomputer 20 by means of plurality of LED drivers 66 for providing a visual indication of the command or status signal received from the CATV headend 12. For example, in a preferred embodiment LED 60 (MPL) is a Message Pending Light used to indicate that a subscriber initiated message is pending, that the CATV headend 12 is currently busy executing another task, and that a response to the subscriber's request will be provided after the current task has been performed. LED 62 (ERL) is used to indicate the entry by a subscriber of an incorrect password or that the subscriber is not eligible for the program requested (i.e. a NEGATIVE ACKNOWLEDGE command). Finally, illumination of LED 64 (ACL) indicates to the subscriber an acknowledgement of receipt by CATV headend 12 of its upstream message and that the subscriber's request has been authorized (i.e. a POSITIVE ACKNOWLEDGE command). These LED's are of different colors to factilitate visual identifications of these various status and command signals by the subscriber. For example, the Message Pending Light 60 may be yellow, the Error Light 62 may be red, and the Acknowledge Light 64 may be green.

There has thus been shown a two-way CATV system wherein headend initiated commands are transmitted during the vertical blanking interval of the downstream video program signals along with subscriber address and program authorization data. The command signals are in the form of a multibit code, each bit of which is represented by the transmission or non-transmission of a subscriber address code. Each transmitted address code is compared to an address code stored in the subscriber terminal for generating the multibit command code, the bits of which are subsequently counted for decoding in accordance with the mode of operation of the terminal so as to control a selected function thereof.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of invention. The matter set forth in the foregoing description and accompanying drawings is offered by way of illustration only and not as a limitation. The actual scope of the invention is intended to be defined in the following claims when viewed in their proper perspective based on the prior art.

I claim:

1. In a two-way CATV system wherein video program signals are transmitted downstream from a headend to a plurality of subscriber terminals each uniquely identified by a respective stored multibit subscriber address code and wherein a plurality of multibit subscriber address codes may be selectively transmitted during a vertical blanking interval of said video program signals, a system for controlling a selected subscriber terminal from said headend comprising:

means associated with said headend for transmitting a multibit command code during the VBI of a selected field of said program signal for controlling said selected subscriber terminal, each bit of said command code being represented by the transmission or non-transmission during a respective time interval of the address code corresponding to the stored address code identifying said selected subscriber terminal;

means coupled to said cable for receiving the transmitted command code and for generating a match signal in response to each received address code that corresponds to the stored address code identifying said selected subscriber terminal; and means for decoding the match signals generated during each vertical blanking interval for selectively controlling said selected subscriber terminal.

2. A subscriber terminal control system as in claim 1 wherein each of said multibit address codes is transmitted on a different horizontal line of the vertical blanking interval of said selected field.

3. A subscriber terminal control system as in claim 2 wherein said decoding means comprises means for counting the number of said match signals developed during the vertical blanking interval of said selected field.

4. A subscriber terminal control system as in claim 3 wherein said subscriber terminal includes transmitting means for transmitting an upstream message to the headend, said terminal being operable in a first STANDBY mode wherein said subscriber terminal awaits receipt of a headend-initiated command code or in a second MESSAGE PENDING mode wherein said subscriber terminal awaits acknowledgement from the headend of receipt of an upstream message transmitted from said subscriber terminal to the headend and wherein said decoding means comprises means responsive to the number of said match signals counted during the vertical blanking interval of said selected field and to the mode of operation of said subscriber terminal for decoding said transmitted command code.

5. A subscriber terminal control system as in claim 4 including means for providing an observable indication to the subscriber of the mode of operation of the subscriber terminal and of the receipt by the terminal of selected headend command codes.

6. A subscriber terminal control system as in claim 4 wherein said subscriber terminal includes a power direction memory whose state is toggled in response to the receipt of a first predetermined headend command code when the terminal is in the STANDBY mode and further including means for adjusting the upstream power transmission level of the terminal transmitting means in accordance with the state of the power direction memory in response to the receipt of a second predetermined headend command code when the terminal is in the STANDBY mode.

7. In a two-way CATV system wherein video program signals are transmitted downstream from a headend to a plurality of subscriber terminals each uniquely identified by a respective stored multibit subscriber address code and wherein a plurality of multibit subscriber address codes may be selectively transmitted during respective lines of a vertical blanking interval of said video program signals, a system for controlling a selected subscriber terminal from said headend comprising:

means associated with said headend for transmitting a multibit command code during the VBI of a selected field of said program signal for controlling said selected subscriber terminal, each bit of said command code being represented by the transmission or non-transmission during a respective vertical interval line of the address code corresponding to the stored address code identifying said selected subscriber terminal;

means coupled to said cable for receiving the transmitted command code and for generating a match signal in response to each received address code that corresponds to the stored address code identifying said selected subscriber terminal; and decoding means for counting the match signals generated during each vertical blanking interval for selectively controlling said selected subscriber terminal in accordance with the number of match signals counted.

8. In a two-way CATV system wherein video program signals are transmitted downstream from a headend to a plurality of subscriber terminals each uniquely identified by a respective stored multibit subscriber address code and wherein a plurality of multibit subscriber address codes may be selectively transmitted during a vertical blanking interval of said video program signals, a system for controlling a selected subscriber terminal from said headend comprising:

means associated with said headend for transmitting a multibit command code during the VBI of a selected field of said program signal for controlling said selected subscriber terminal, each bit of said command code being represented by the transmission or non-transmission during a respective time interval of the address code corresponding to the stored address code identifying said selected subscriber terminal;

means coupled to said cable for receiving the transmitted command code and for generating a match signal in response to each received address code that corresponds to the stored address code identifying said selected subscriber terminal;

means for decoding the match signals generated during each vertical blanking interval;

means for transmitting an upstream message from the subscriber terminal to the headend; and a power direction memory whose state is toggled in response to a first predetermined decoded headend command code and further including means for incrementally adjusting the upstream power transmission level of the terminal transmitting means in accordance with the state of the power direction memory in response to a second predetermined decoded headend command.

9. In a two-way CATV system wherein video program signals are transmitted downstream from a headend to a plurality of subscriber terminals each uniquely identified by a respective stored multibit subscriber address code and wherein a plurality of multibit subscriber address codes may be selectively transmitted during a vertical blanking interval of said video program signals, a system for controlling a selected subscriber terminal from said headend comprising:

means associated with said headend for transmitting a multibit command code during the VBI of a selected field of said program signal for controlling said selected subscriber terminal, each bit of said command code being represented by the transmission or non-transmission during a respective time interval of the address code corresponding to the stored address code identifying said selected subscriber terminal;

means coupled to said cable for receiving the transmitted command code and for generating a match signal in response to each received address code that corresponds to the stored address code identifying said selected subscriber terminal;

transmitting means for transmitting an upstream message from the subscriber terminal to the headend, said subscriber terminal being operable in a first STANDBY mode wherein said subscriber terminal awaits receipt of a headend-initiated command code or in a second MESSAGE PENDING mode wherein said subscriber terminal awaits acknowledgement from the headend of receipt of an upstream message transmitted from said subscriber terminal to the headend; and decoding means responsive to said match signals and to the mode of operation of the subscriber terminal for decoding said transmitted command code.

* * * * *